United States Patent Office 2,874,170
Patented Feb. 17, 1959

2,874,170

6-DEHYDRO-17-ALKYL-19-NORTESTOSTERONES AND ESTERS THEREOF

Frank B. Colton, Chicago, Ill., assignor to G. D. Searle & Co., Chicago, Ill., a corporation of Delaware No Drawing. Application March 25, 1957
Serial No. 647,968

9 Claims. (Cl. 260—397.4)

The present invention relates to certain highly active synthetic progestational agents and, more particularly, to 6-dehydro-17-alkyl-19-nortestosterones and esters thereof. The compounds which constitute this invention can be represented by the general structural formula

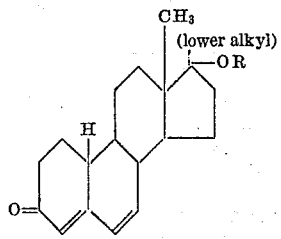

wherein R is a member of the class consisting of hydrogen, benzoyl, and acyl radicals derived from aliphatic hydrocarbon carboxylic acids containing one to eight carbon atoms.

In the foregoing structural formula R can represent hydrogen, benzoyl radicals and acyl radicals, derived from aliphatic carboxylic acids, such as formyl, acetyl, propionyl, butyryl, pentanoyl, hexanoyl, cyclopentaneacetyl, cyclopentanepropionyl, cyclohexaneacetyl, and the like. The lower alkyl radical in the 17-position can be a methyl, ethyl, straight-chained or branched propyl and butyl, amyl, hexyl, heptyl or octyl radical.

The 4,6-dienes of this invention can be prepared by the manganese dioxide oxidation of the corresponding 17-alkyl-19-nortestosterones.

Alternatively they can be prepared by treatment of the corresponding 5-androsten-3-ol by oxidation with aluminum isopropoxide in the presence of a quinone as hydrogen acceptor.

The compounds of this invention are potent progestational agents. They differ from the corresponding 17-alkyl-19-nortestosterones in lacking some of the side-effects of these compounds. For instance the claimed compounds have only minimal androgenic activity and are not as potent anabolic agents. This is particularly true of the esters. The claimed compounds thus offer long acting, specific, highly active progestational agents with minimal side-effects.

The compounds and methods of manufacture which constitute this invention will appear more fully from the following examples. In these examples quantities are given in parts by weight and temperatures in degrees centigrade (° C.).

Example 1

To a solution of 0.1 part of concentrated sulfuric acid in 60 parts of isopropenyl acetate are added 6.6 parts of 17-ethyl-19-nortestosterone. The mixture is refluxed for 45 minutes after which about 5 parts of distillate are removed. Refluxing is then continued for one hour and 0.20 part of sodium acetate are then added. The solvent is removed under vacuum and the residue is taken up in 105 parts of chloroform. The sodium sulfate is removed by filtration and the filtrate is concentrated on a steam bath under nitrogen to about 10 parts. Then 100 parts of hot methanol are added. On chilling there is obtained 3,17 - diacetoxy - 17α - ethyl - 3,5 - androstadiene. On recrystallization from chloroform and methanol and then from petroleum ether the compound melts at about 100–112° C.

To a solution of 4.4 parts of 3,17-diacetoxy-17α-ethyl-3,5-androstadiene in 160 parts of 95% ethanol there is added a solution of 5 parts of sodium borohydride in 80 parts of 70% ethanol. The mixture is permitted to stand at 0° C. for 60 minutes and then the unreacted sodium borohydride is decomposed by the dropwise addition of acetic acid. A large excess of water is added and the mixture is cooled to 0° C. The resulting precipitate is collected on a filter, washed with water, air dried and crystallized from aqueous methanol and then repeatedly from a mixture of acetone and petroleum ether. The 17-acetoxy-17α-ethyl-5-androsten-3-ol thus obtained shows a double melting point at about 90–96° C. and 115–120° C.

To a solution of 0.5 part of 17-acetoxy-17α-ethyl-5-androsten-3-ol in 50 parts of anhydrous ether there are added 0.5 part of lithium aluminum hydride. The mixture is stirred at room temperature for four hours after which the unreacted lithium aluminum hydride is decomposed by dropwise addition of ethyl acetate. Then ethanol and water are added. The organic layer is separated, washed with water and then with a saturated sodium chloride solution, dried over anhydrous sodium sulfate, filtered and evaporated under nitrogen. The 17α-ethyl-5-androsten-3,17-diol thus obtained is purified by crystallization from acetone and petroleum ether, yielding a product melting at about 193–196° C. The specific rotation of this product is $[\alpha]_D = -47.7°$ as determined in chloroform solution. Under anhydrous conditions a solution of 5 parts of aluminum isopropoxide in 70 parts of toluene is added to a mixture of 4.5 parts of 17α-ethyl-5-androsten-3,17-diol and 20 parts of benzoquinone in 125 parts of refluxing toluene. Refluxing is continued for 30 minutes after which it is cooled and treated with 100 parts of water. After 30 minutes of stirring, 10 parts diatomaceous earth are added and the reaction mixture is filtered through a filteraid pad. The pad is washed and triturated with 350 parts of ether. The ether solution is washed repeatedly with water, dried and concentrated under vacuum. The residue is triturated with chloroform and filtered. The chloroform solution is taken to dryness under nitrogen. The residue is applied to a chromatography column packed with silica gel. The column is developed with benzene and benzene solutions containing increasing concentrations of ethyl acetate. Elution with a 15% solution of ethyl acetate in benzene gives an eluate which, on concentration, yields a crude product. The latter is submitted to a second chromatographing process. Elution with a 15% concentration of ethyl acetate in benzene yields the 6-dehydro-17-ethyl-19-nortestosterone. The ultraviolet absorption spectrum shows maxima at 282 millimicrons with a molecular extinction coefficient of about 24,900. The infrared absorption spectrum shows maxima at 2.8, 6.05, 6.2 and 6.3 microns.

Example 2

To an anhydrous mixture of 10 parts of 17-acetoxy-17α-ethyl-5-androsten-3-ol and 40 parts of benzoquinone in 250 parts of refluxing toluene there are added 10 parts of aluminum isopropoxide in 150 parts of toluene. After refluxing for 30 minutes the mixture is cooled and treated with water. The oxidation mixture is worked up as in the preceding example. The chromatography is carried out in the same manner except that the product is eluted with a 5% concentration of ethyl acetate in benzene. There is thus obtained 6-dehydro-17-ethyl-19-nortestosterone acetate. The ultraviolet absorption spectrum shows a maximum at 280 millimicrons with a molecular extinction coefficient of about 25,400. Infrared maxima are observed at 5.8, 6.05, 6.2 and 6.3 microns. The butyrate is prepared by a strictly analogous procedure using the 17-butyroxy-17α-ethyl-5-androsten-3-ol.

*Example 3*

A mixture of 10 parts of 17-butyl-19-nortestosterone, 100 parts of freshly prepared manganese dioxide and 500 parts of benzene is heated at refluxing temperature for 3 hours, cooled and filtered. The filtrate is concentrated on the steam bath. The residue is taken up in benzene and applied to a chromatography column containing silica gel. The column is eluted with benzene and then developed with mixtures of benzene containing increasing amounts of ethyl acetate. A solution containing 10% ethyl acetate elutes the 6-dehydro-17-butyl-19-nortestosterone. The compound displays an ultraviolet maximum at 282 millimicrons with a molecular extinction coefficient of 25,000. Infrared maxima are observed at 2.8, 6.05, 6.2 and 6.3 microns.

*Example 4*

A stirred mixture of 10 parts of 17-propyl-19-nortestosterone acetate, 80 parts of manganese dioxide and 1000 parts of toluene is heated at reflux for 4 hours and filtered. The filtrate is clarified by treatment with charcoal and then evaporated to yield an oil. A benzene solution of this oil is applied to a chromatography column which is then developed with benzene and mixtures of benzene containing increasing amounts of ethyl acetate. Elution with a 5% solution of ethyl acetate in benzene elutes the 6-dehydro-17-propyl-19-nortestosterone acetate. The ultraviolet absorption spectrum shows a maximum at 282 millimicrons with a molecular extinction coefficient of 25,500. Infrared maxima are observed at 5.8, 6.05, 6.2 and 6.3 microns.

What is claimed is:
1. A compound of the structural formula

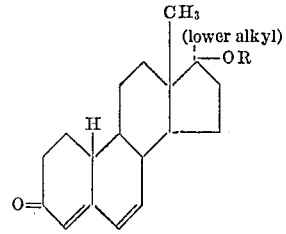

wherein R is a member of the class consisting of hydrogen and (lower alkyl)-CO-groups.
2. 6-dehydro-17-(lower alkyl)-19-nortestosterone.
3. 6-dehydro-17-ethyl-19-nortestosterone.
4. 6-dehydro-17-propyl-19-nortestosterone.
5. 6-dehydro-17-butyl-19-nortestosterone.
6. A compound of the structural formula

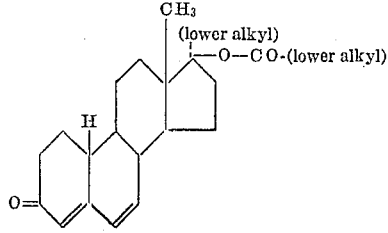

7. 6-dehydro-17-(lower alkyl)-19-nortestosterone acetate.
8. 6-dehydro-17-ethyl-19-nortestosterone acetate.
9. 6-dehydro-17-butyl-19-nortestosterone acetate.

References Cited in the file of this patent
FOREIGN PATENTS 884,085    France _____ Apr. 12, 1943